(12) United States Patent
Kreis

(10) Patent No.: US 11,199,730 B2
(45) Date of Patent: Dec. 14, 2021

(54) METHOD FOR PRODUCING INDIVIDUAL SPECTACLE LENSES IN ACCORDANCE WITH A PRESCRIPTION ORDER

(71) Applicant: Satisloh AG, Baar (CH)

(72) Inventor: Michael Kreis, Gründau (DE)

(73) Assignee: Satisloh AG

( * ) Notice: Subject to any disclaimer, the term of this patent is extended or adjusted under 35 U.S.C. 154(b) by 555 days.

(21) Appl. No.: 16/184,215

(22) Filed: Nov. 8, 2018

(65) Prior Publication Data
US 2019/0137791 A1 May 9, 2019

(30) Foreign Application Priority Data

Nov. 8, 2017 (DE) .......................... 102017010321.6

(51) Int. Cl.
*G02C 13/00* (2006.01)
*B24B 13/06* (2006.01)
(Continued)

(52) U.S. Cl.
CPC .......... *G02C 13/001* (2013.01); *B24B 13/005* (2013.01); *B24B 13/0037* (2013.01);
(Continued)

(58) Field of Classification Search
CPC .... G02C 13/001; G02C 13/006; B24B 13/06; B24B 27/0069; B24B 13/005; B24B 13/0037; B29D 11/00942; B29D 11/00423
See application file for complete search history.

(56) References Cited

U.S. PATENT DOCUMENTS 7,748,341 B2   7/2010 Muster et al.
7,975,356 B2   7/2011 Schäfer et al.
(Continued)

FOREIGN PATENT DOCUMENTS

DE   102004021696 A1 * 11/2005 ......... B24B 13/0052
DE   102004021696 A1   11/2005
(Continued)

OTHER PUBLICATIONS

Extended European Search Report; Applicant: Satisloh AG: Application No. 1800865.8; dated May 3, 2019; 8 pages.
(Continued)

*Primary Examiner* — James C. Jones
(74) *Attorney, Agent, or Firm* — Reising Ethington P.C.

(57) ABSTRACT

A method of preparing individual spectacle lenses (L) in accordance with a prescription order comprises the steps of: (i) blocking, a provided lens blank (LR) as workpiece on a block piece provided from a plurality of block pieces (B) from a block piece store (BL), (ii) processing the blocked lens blank at least at a second surface so as to obtain a blocked, processed spectacle lens (L) as workpiece, and (iii) deblocking the processed spectacle lens from the block piece, wherein the workpiece, optionally in the blocked state, is transported between the steps (i) to (iii) in one of a plurality of provided transport boxes (T). In the method, the block pieces prior to the step (i) of blocking are stored in the transport boxes in the block piece store and, for the step (i) of blocking, are provided in the transport boxes from the block piece store.

24 Claims, 7 Drawing Sheets

(51) Int. Cl.
   *B29D 11/00*  (2006.01)
   *B24B 13/00*  (2006.01)
   *B24B 27/00*  (2006.01)
   *B24B 13/005* (2006.01)

(52) U.S. Cl.
   CPC .......... *B24B 13/06* (2013.01); *B24B 27/0069* (2013.01); *B29D 11/00423* (2013.01); *B29D 11/00942* (2013.01); *G02C 13/006* (2013.01)

(56) References Cited

U.S. PATENT DOCUMENTS

| | | |
|---|---|---|
| 8,382,932 B2 | 2/2013 | Savoie |
| 8,616,150 B2 | 12/2013 | Savoie et al. |
| 8,628,071 B2 | 1/2014 | Fiedler et al. |
| 8,905,388 B2 | 12/2014 | Breme et al. |
| 8,931,769 B2 | 1/2015 | Pavel et al. |
| 9,862,087 B2 | 1/2018 | Schneider et al. |
| 2004/0235397 A1 | 11/2004 | Lack |
| 2017/0246720 A1 | 8/2017 | Wallendorf et al. |

FOREIGN PATENT DOCUMENTS

| | | |
|---|---|---|
| DE | 102015015040 A1 | 5/2017 |
| WO | WO2018153787 A1 | 8/2018 |

OTHER PUBLICATIONS

DIN58763; "Production in Optical Engineering—Transport Tray—for Spectacle Lens Production in Rx Workshops" Jun. 1997; 2 pages.

DIN58766; "Production in Optical Engineering—Block Diameter 43 mm for Manufacturing of Ophtalmic Lenses" Mar. 1998; 2 pages.

Heepen, Frank; "Introduction to Alloy-Free Lens Production"; Aug. 15, 2018; 36 pages.

German Office Action; Applicant: Satisloh AG; Application No. 102017010321.6; dated Jul. 31, 2018; 5 pages.

* cited by examiner

METHOD FOR PRODUCING INDIVIDUAL SPECTACLE LENSES IN ACCORDANCE WITH A PRESCRIPTION ORDER

TECHNICAL FIELD

The present invention relates to a method for producing individual spectacle lenses.

PRIOR ART

The working or processing stations in production shops for producing individual spectacle lenses from customary materials for example polycarbonate, mineral glass, and CR 39, HI-index, in accordance with a prescription order—also called "job"—are usually automated to a high degree. In that regard, serving within the production as transport means are transport boxes—also termed prescription boxes or "job trays"—which are transported between the individual stations by way of, for example, transport belts, transverse roller devices for transverse exclusion from the material flow, lifting devices, switches, etc. Such transport boxes are the subject of, for example, German Standard DIN 58763.

As described in, for example, document U.S. Publication No. 2004/0235397 in each instance the right hand and left hand spectacle lenses of a prescription order and optionally the associated precision-grinding tool or polishing tool for the respective spectacle lens can be received in the transport boxes. In addition, a transport box of that kind has a compartment for the often written in-house order. This usually carries a marking in the form of a barcode or the like. On many occasions the transport boxes themselves are also equipped with so-called "transponders" or "Radio Frequency Identification Devices", (RFID for short), i.e. semiconductor elements for storage and transmission of data with the help of which an identification of the respective prescription order and the instantaneous state of processing of the spectacle lenses is possible.

Spectacle lenses of various materials have to be supplied by the transport boxes to different work stations or machines at which the spectacle lenses are processed by different additives and work materials (for example, polishing media, polishing pads) as well as different process parameters. A major part of this processing of the spectacle lenses takes place on so-called "block pieces" which serve the purpose of holding the spectacle lens blanks during processing in the respective processing machine or processing device. Such block pieces are the subject of, for example, German Standard DIN 58766.

According to this Standard, for so-called "blocking" of a spectacle lens blank on such a block piece, the block piece is initially brought into a predetermined position relative to a surface, which is usually protected by use of a film, of the spectacle lens blank. Then, in this position the space between block piece and spectacle lens blank is filled with a molten material, conventionally usually a Wood's metal, also termed "alloy", i.e. a metallic alloy usually based on bismuth. After hardening of the filler material, the block piece represents a mount for processing the spectacle lens blank.

In order to avoid the use of heavy metals connected with the afore-described alloy technology, to make handling safer for users and to reduce the loading of the environment in the production of spectacle lenses a technology for alloy-free blocking was developed by the Applicant, called "ART" (standing for Alloy Replacement Technology) for short. This ART technology is described in detail in the brochure "Introduction to Alloy-free lens production", Frank Heepen, Product Management Blocking & Deblocking, V5.1LC of 15 Aug. 2015 published by Satisloh GmbH.

In summary, ART technology employs a universal, reusable organic block piece and ultraviolet-hardenable adhesive as blocking material for connection of a block piece and a spectacle lens blank instead of alloy and film so as to fix and protect the spectacle lens blanks in every case for so-called "generating", i.e. the preliminary processing of the optically effective surface of the spectacle lens blank for creating the macrogeometry in accordance with prescription, and polishing, thus precision-processing of the optically effective surface to eliminate preliminary-processing tracks and to obtain the desired microgeometry, as well as optionally also subsequent steps for example marking and coating. These block pieces in general have a substantially rotationally symmetrical base body which has on one side a lens fastening surface on which the lens blank can be blocked by use of the blocking material and on the other side a standardized chucking section by way of which the lens blank blocked on the base body can be fixed in a machine or device for processing or treating the lens blank.

As a rule, different groups of block pieces differing with respect to block curvature—also called "basic curve"—and diameter of lens fastening surface are used in an ART production shop. By that, primarily the object is pursued of approximating the geometry of the lens fastening surface of the block piece as much as possible to the respective geometry of the surface of the lens blank to be blocked. On the one hand the lens blank shall, by selection of a suitable diameter of the lens fastening surface at the block piece, undergo support over as much as possible of the whole area for the processing and be protected over as much as possible of the whole area at its surface which faces the block piece and which as a rule is processed to finished state and optionally also coated. On the other hand, through selection of a suitable block curvature it is to be ensured that the blocking material between lens blank and block piece does not have substantial differences in thickness which due to shrinkage phenomena in the blocking material can lead to stresses in the blocked lens blank and ultimately to errors in geometry at the spectacle lens deblocked from the block piece, as described in detail in, for example, document U.S. Pat. No. 8,382,932.

Consequently, the result is a certain number of different block piece groups which, depending on how the ART production shop is operated, can amount to approximately 20 to 40. In production shops with reuse of block pieces the block pieces not in immediate use have to be stored in the interim or kept in reserve. The block pieces are typically stored—sorted according to block piece groups—as bulk material in a corresponding number of storage boxes. The individual block pieces are in that case denoted by a Data Matrix Code (DMC for short), which allows individual tracking and management by use of a computer system.

If a prescription order is on hand, then a process control predetermines the block piece or members appropriate thereto, normally two block pieces, a respective one for each of the left hand and right hand spectacle lenses of the prescription order, but in a given case also only one if only one spectacle lens is to be made. The association of the block pieces, which are predetermined by the process control, with the respective prescription order is usually undertaken as a manual process: an operator removes the appropriate block piece or members from the corresponding storage box or boxes. In order to reduce confusion and mistakes this can be assisted by a so-called "pick-by-light" system in which a light controlled by the process control illuminates the appropriate storage box. The operator then places the appropriate block piece or members in the transport box to be readied. In that case, linking with the respective prescription order is carried out by way of the process control through scanning the DMC of the block pieces.

After completing the transport boxes with the lens blanks appropriate to the respective prescription order the workpieces and block pieces run through the production process with the principal steps of (i) blocking the lens blanks on the block pieces, (ii) treating, i.e. processing and in a given case coating, the blocked lens blanks and (iii) deblocking the treated spectacle lenses from the block pieces, in which case transport between these steps takes place by use of the transport boxes which in each instance remain associated with the respective prescription order. After the deblocking procedure the used block pieces are conventionally brought back in the storage boxes from the production line as bulk material for cleaning, checking and sorting.

In order to reduce the manual effort connected therewith a fully automated deblocking system is available from the Applicant under the trade designation ART-Deblocker-A, which loads processed spectacle lenses in the deblocked state from transport boxes, then separates these from the block piece and finally places the deblocked spectacle lenses back in the transport boxes. In that case, the deblocking system separates block piece, blocking material and spectacle lens by water jet and thereafter also dries the front and rear sides of the respective spectacle lens for preparation for inspection. For reuse of the block pieces as efficiently as possible this deblocking system is ultimately also in a position of sorting the block pieces according to diameter and curvature and filing them in the appropriate storage boxes.

Finally, mention is also made in the aforesaid ART brochure of a block sorting system which is separate from the actual deblocking system and which is in a position of sorting used block pieces, which are returning from the production line, according to diameter and curvature and in that case also taking into consideration on the basis of the DMC of the respective block piece how often a block piece has already been used, as a criterion for whether the respective block piece is to be reused again or, however, separated out.

The prior art described to that extent does indeed fulfil the functional requirements for production of individual spectacle lenses according to prescription. However, the discussed manual working steps occasion a certain degree of outlay, which is connected with additional costs. Moreover, there is the risk of incorrect block pieces being assigned to specific prescription orders. Not least, the afore-described automatic approaches require a large deposit area and a relatively high investment per stored block piece.

What is desired is indicating a method for producing individual spectacle lenses according to a prescription order, which makes it possible to transport, store and when required call up a sufficient number of block pieces in space-saving manner and with least possible effort.

SUMMARY OF THE INVENTION

According to one aspect of the invention, a method for producing individual spectacle lenses according to a prescription order comprises the following main steps (i) to (iii): (i) blocking a provided lens blank as workpiece, which has a first surface, a second surface opposite the first surface and an edge between the first surface and the second surface, with the help of a blocking material on a block piece provided from a plurality of block pieces from a block piece store, wherein the first surface of the lens blank faces a lens fastening surface of the block piece, (ii) processing the blocked lens blank at least at the second surface so as to obtain a blocked, processed spectacle lens as workpiece and (iii) deblocking the processed spectacle lens from the block piece; wherein the workpiece, which in each instance may be in the blocked state, is transported between the steps (i) to (iii) in one of a plurality of provided transport boxes—the block pieces are stored in the transport boxes in the block piece store prior to the step (i) of blocking and are provided in the transport boxes from the block piece store for the step (i) of blocking and/or are transported in the transport boxes to the block piece store after the step (iii) of deblocking.

In other words, the solution according to the invention is based not on handling, i.e. transporting or storing, the block pieces and transport boxes separately from one another, but on using for that purpose the transport boxes, which are in any case to be transported and intermediately stored, as a—moving and/or stationary—block piece store. The actions, particularly manual actions, connected with the separation of block piece and transport box or (re-)allocation of block piece to transport box and the outlay connected therewith can to the greatest possible extent be avoided. Identification of the block pieces remaining in the transport boxes can in that case be carried out easily by way of, for example, RFID or DMC at the transport boxes and/or block pieces. Since the transport boxes have to be stored in any case and always at least half as many transport boxes have to be available as block pieces no additional need for space arises. Rather, by comparison with a conventional solution one of the stores for transport boxes and block pieces can be saved, which offers advantages not only with respect to cost, but also with respect to deposit area.

As a result, the measures according to one aspect of the invention, particularly in the case of maximized automation with greatest possible exclusion of manual transporting, sorting or allocation operations can serve for minimization not only of errors related thereto, but also transit times for prescription orders, which makes possible a more rapid delivery capability of higher-quality spectacle lenses. At the same time, the hardware outlay connected with the production of individual spectacle lenses according to prescription is significantly reduced by saving one of the stores for transport boxes and block pieces and the additional area connected therewith. There is thus in many respects a considerable increase in efficiency in the production sequence, particularly when there is operation in a completely closed circuit ("closed loop"), with transport and storage of the block pieces in the transport boxes even between the step (iii) of deblocking and the step (i) of blocking.

Some of the advantages of the method according to the invention are already evident in the case of production of spectacle lenses in which one type of block piece or just a few types of block piece are used. However, the method according to the invention is particularly advantageous when block pieces with different predetermined block piece geometries differing with respect to block curvature of the lens fastening surface and/or diameter of the lens fastening surface are kept in reserve in the transport boxes in the block piece store, which is provided with at least one storage region, wherein the transport boxes and/or the block pieces are provided with an information carrier which when detected by way of a computer process control system (often referred to as a process control for short), particularly for sorting the block piece store and optionally providing specific block pieces for the step (i) of blocking, imparts at least information about the block piece geometry of the block pieces contained in the respective transport box. Thus, for example, in a specific example of use thirty-six individual block piece types are provided, with six different diameters of the lens fastening surface and six different block curvatures thereat, with corresponding management of the block piece store by way of the process control. This would be a preferred approach in the case of use of the method according to the invention in the scope of the afore-described ART technology.

In this example, i.e. several different types of block piece, in a further advantageous embodiment of the invention the block piece store can comprise a flexible box store as storage region, in which the transport boxes with the block pieces received therein are chaotically stored at fixed storage places, wherein association of the respective storage space with the transport box stored thereat is carried out as a function of the information of the corresponding information carrier. Such a storage method is very flexible and can be carried out free of problems and rapidly. The next free storage space in the flexible box store is occupied in simple manner by a just arriving transport box, which is identified with respect to the block pieces contained therein, with the assistance of a suitable handling system, whereupon a storage space number for the corresponding block piece type is read out by the process control. If this block piece type is needed again the appropriate transport box can be removed again by use of the handling system by way of the associated storage space number and output. This can preferably be carried out in accordance with a First in/First Out principle (FIFO principle for short), i.e. the transport box deposited first in the flexible box store with a specific block piece type is also first to leave the box store again when the relevant block piece type is required.

In a further preferred embodiment it can be provided that the block piece store comprises an unsorted buffer store as storage region in which the transport boxes with the block pieces received therein are stored unsorted, wherein preferably stacking of the transport boxes is carried out. This procedure makes possible in space-saving manner rapid reception of transport boxes in the block piece store when the other storage capacities therein are exhausted or fully utilized, which can be the case when, for example, production takes place slowly or in protracted manner (production is slow or slowed down).

It is additionally preferred if the block piece store comprises a sorted buffer store as storage region in which the transport boxes with the block pieces received therein are stored according to block piece geometry in correspondence with the information of the information carrier, wherein preferably stacking of the transport boxes each with the same block pieces is carried out. Thus, it is possible to store in the transport boxes in simple and space-saving manner those block pieces which are used frequently (so-called "high runners") and when required are again rapidly delivered from the block piece store.

In further pursuance of one concept of the invention the block piece store can have a store entrance and a store exit connected together by way of a conveyor path for the transport boxes, the path being connected with the storage region or regions, wherein the transport boxes with the block pieces received therein are conveyed under the control of the process control via the conveyor path selectably from the store entrance to the respective storage region, from the respective storage region to the store exit or from the store entrance directly to the store exit, which allows very flexible storage of the block pieces in the block piece store, such flexible storage enabling rapid reaction to fluctuations in capacity utilization in the production line.

In a first alternate method, the control of the block piece store can be carried out in such a way that for the step (i) of blocking the provision of the respective block piece is carried out by way of the computer process control system as a function of a geometry, which is defined by the description order, of the spectacle lens, which is to be produced, by output from the block piece store of the transport box laden with the corresponding block piece identified by way of the information carrier to the computer process control system. For most cases this represents the required procedure, because the prescription order also determines timing of the next production process.

By contrast, in a second alternate method the process control can take place in such a way—with the assistance of the afore-described "bypass" possibility by use of the direct conveyor path between store entrance and store exit in the block piece store—that for the step (i) of blocking the provision of a respective lens blank is carried out by way of the process control as a function of the information of the information carrier with respect to the blocking geometry of the block piece contained in the transport box currently conveyed by way of the conveyor path between store entrance and store exit. Such a procedure may, for example, be required when the actual prescription order to be processed next, for example due to the time of order receipt, would require block pieces for which no access or no rapid access is directly possible in the block piece store. This is also required for, inter alia, utilization of the production line to the greatest extent possible and as consistently as possible.

A constantly high quality of production is additionally promoted if the process control on detection of the information carrier also has information about the frequency of use of the block pieces contained in the respective transport boxes, wherein arranged upstream of the block piece store is a switch which is so controlled by use of the process control as a function of this information that the switch when a predetermined frequency of use is exceeded transfers out the corresponding transport boxes for manual collection and cleaning of block piece and/or transport box, but otherwise passes on the corresponding transport boxes with the block pieces received therein to the block piece store. This also leads to unification of the checking or cleaning procedures at the block pieces in transport boxes, which similarly contributes to high productivity.

In principle, the information carriers at the transport boxes and/or block pieces can be merely readable and read, such as is the case, for example, with a prescription order of paper at the transport box or a DMC at the block piece. However, it is preferred for the information carrier at the transport boxes and/or the block pieces to be not only readable, but also writable with information preferably by the computer process control system, wherein for consideration in respective downstream steps the information of the respective information carrier is changed or extended by writing, prior to the step (i) of blocking, with respect to urgency of the respective prescription order and/or, at the time of the step (i) of blocking, with respect to blocking parameters relevant to the step (ii) of processing and/or, during the step (ii) of processing, with respect to changes in geometry of the respective block pieces and/or, after the step (iii) of deblocking, with respect to a need for cleaning the respective block pieces. Thus, not only the computer process control system should be in possession of the information relevant for the following steps, but also the respective transport box or respective block piece itself carries this information in redundant manner, which can serve for increasing reliability relative to breakdown, functioning and operation in the production line. Finally, this also allows an operator or controller with a suitable read-out possibility to ascertain a corresponding status of the respective prescription order in the transport box without access to the process control, which can be of advantage, for example, within the scope of quality safeguarding measures or, however, if a transport box—for whatever reason—has to be temporarily removed from the production line.

BRIEF DESCRIPTION OF THE DRAWINGS

The invention is explained in more detail in the following by way of a preferred embodiment with reference to the accompanying partly simplified or schematic drawings, in which.

DETAILED DESCRIPTION OF THE EMBODIMENT

Figure 1:
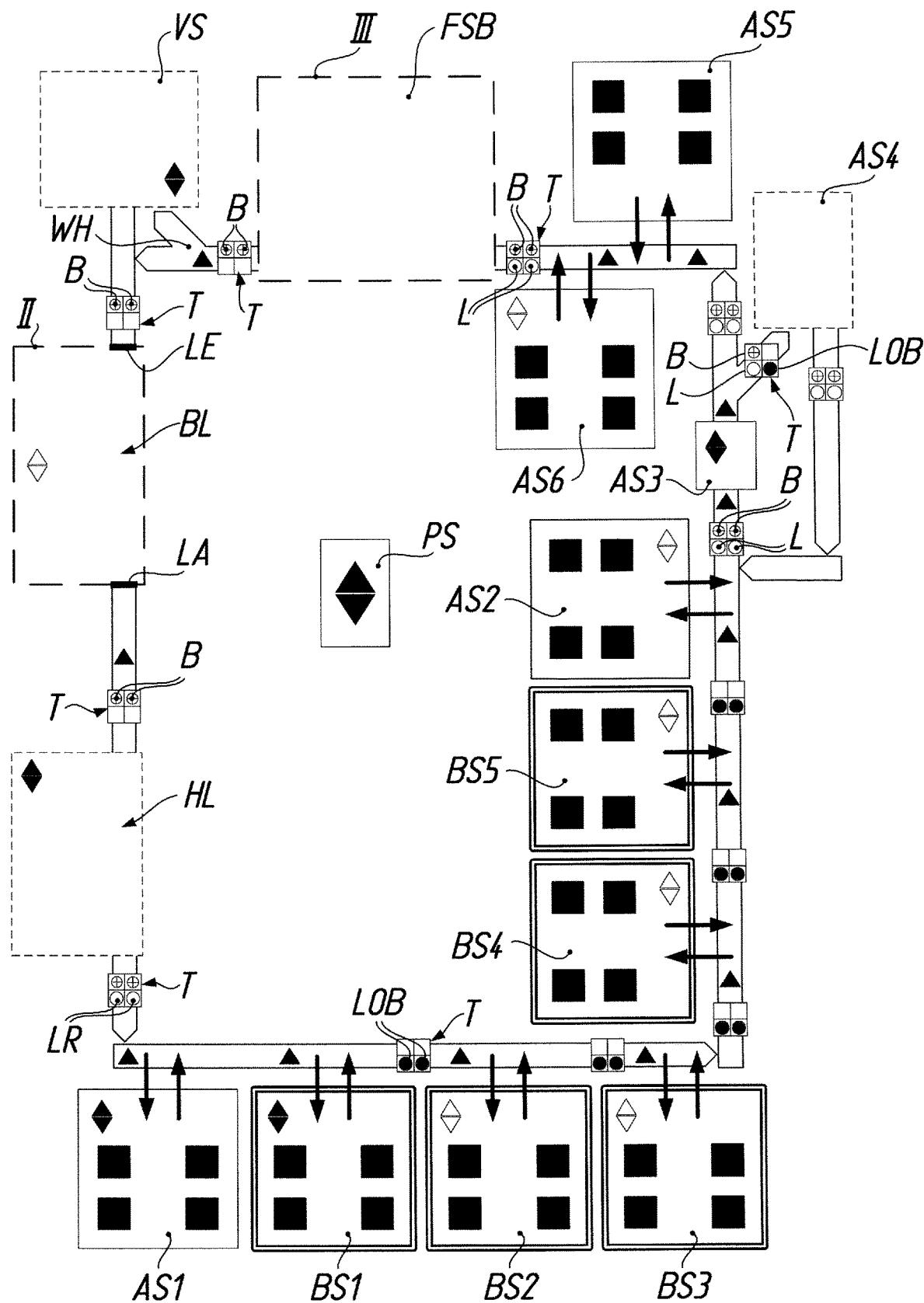
FIG. 1 shows a layout of a production shop for producing individual spectacle lenses according to prescription order, in which the method according to the invention can be carried out, wherein a block piece store for block pieces used during the production as well as a finishing region for the spectacle lenses and spectacles are illustrated merely as empty blocks.

FIG. 1 shows a layout of a production shop for production of individual spectacle lenses L according to a prescription order, in which, as described in more detail in the following, the following steps are in general run through in the indicated sequence for the production: (i) blocking a provided lens blank LR with a block piece which is provided from a plurality a block pieces B from a block piece store BL, (ii) processing the blocked lens blank LR in order to obtain a blocked, processed spectacle lens L and (iii) deblocking the processed spectacle lens L from the block piece B. The respective workpieces and block pieces for a prescription order are transported between the aforesaid steps (i) to (iii) in one of a plurality of provided transport boxes T. In the case of the embodiment described here, there are in addition two features as explained in more detail in the following, namely on the one hand that the block pieces B are stored, prior to the step (i) of blocking, in the transport boxes T in the block piece store BL and are provided in the transport boxes T from the block piece store BL for the step (i) of blocking and on the other hand that the block pieces B after the step (iii) of deblocking are transported in the transport boxes T to the block piece store BL.

Before further details of the production layout of FIG. 1 and of the production method taking place therein are described, the construction and function of the transport boxes T used for production shall be first explained with reference to FIGS. 4 to 11.

Figure 4:
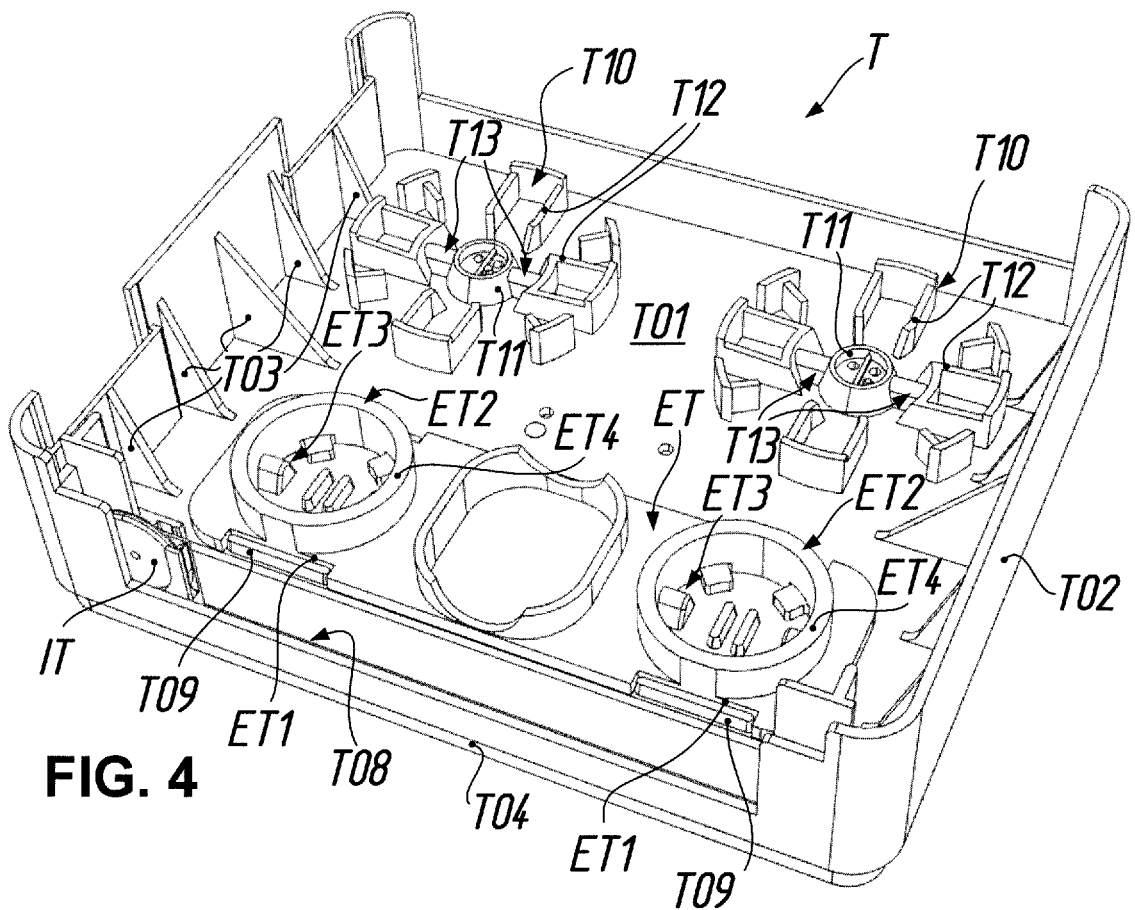
FIG. 4 shows a perspective view of an empty transport box obliquely from above and front right, which can be used in the performance of the method according to the invention in the production layout according to FIG. 1.
Figure 5:
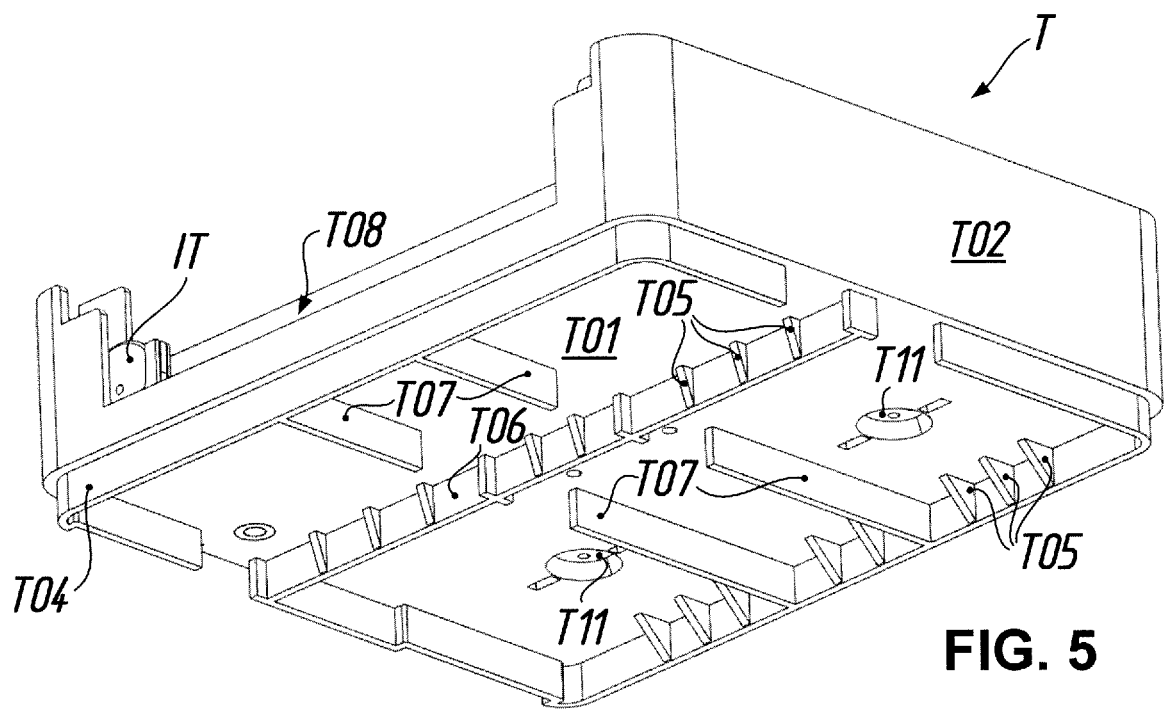
FIG. 5 shows a perspective view of the empty transport box according to FIG. 4 obliquely from below and front right.
Figure 6:
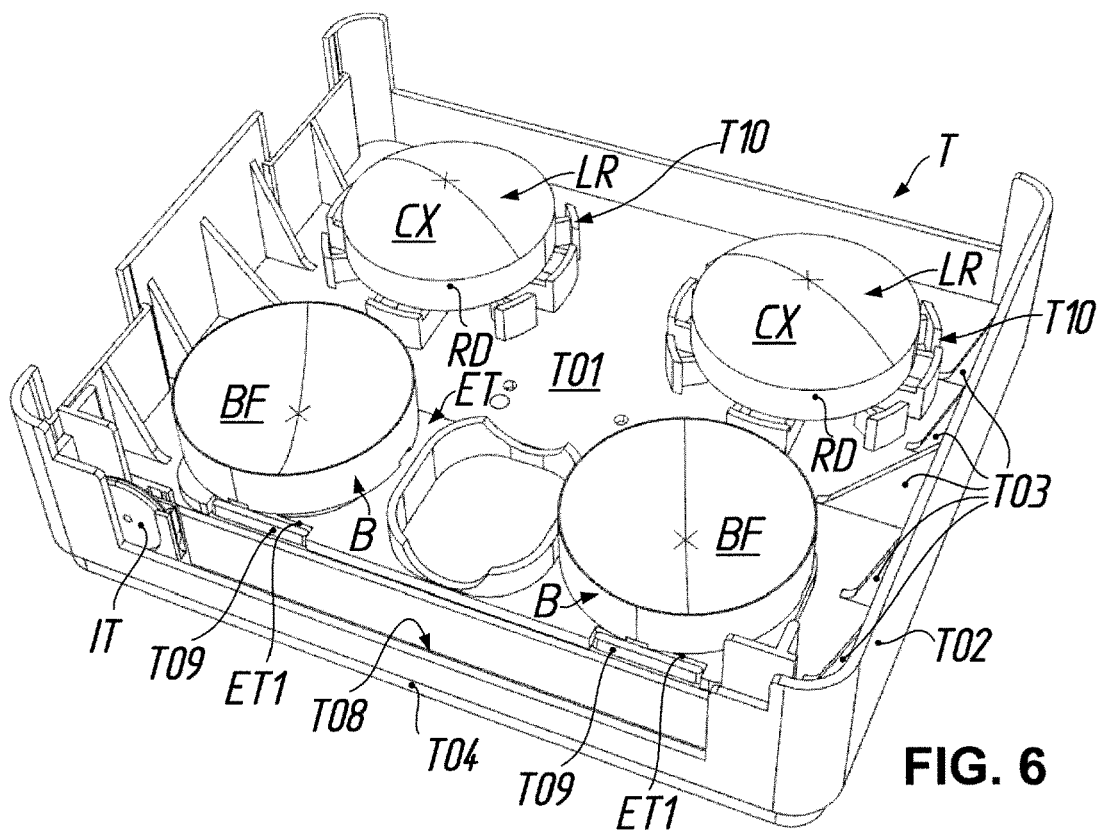
FIG. 6 shows a perspective view of the transport box according to FIG. 4 obliquely from above and front right, which in accordance with a prescription order is equipped with two lens blanks and two block pieces in order to be transported in the production layout of FIG. 1 to a blocking station.
Figure 7:
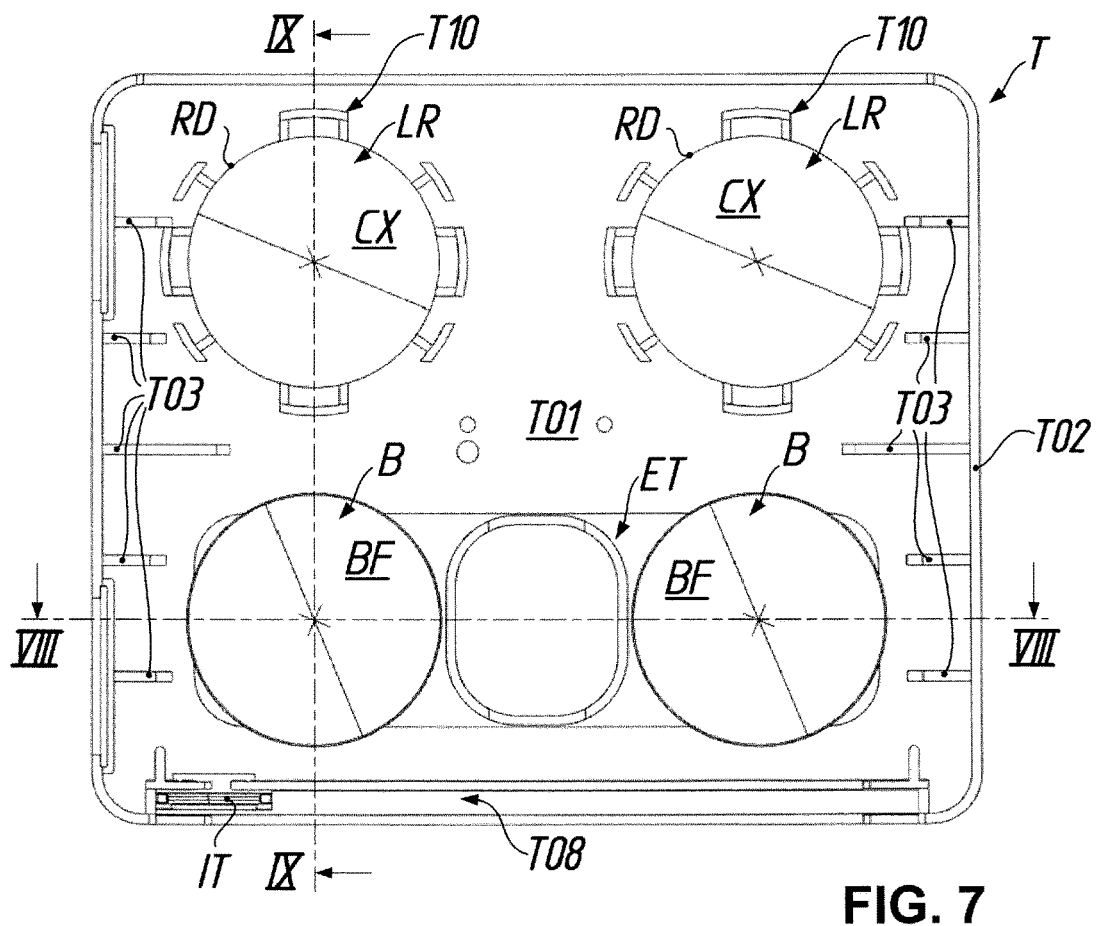
FIG. 7 shows a plan view of the transport box of FIG. 4 equipped in accordance with FIG. 6.

According to, in particular, FIGS. 4 and 5 the transport boxes T, which are preferably injection-molded from a suitable plastics material, have a substantially rectangular box base T01, from the edge of which an encircling box wall T02 extends upwardly on the upper side of the transport box T, which box wall includes with the box base T01 an approximate right angle and is stiffened on the transverse sides of the transport box T relative to the box base T01 by a plurality of ribs T03.

An apron section T04 extends on the underside of the transport box T in substantially encircling manner approximately at right angles away from the box base T01 and, in particular, with a slight offset inwardly from the edge of the box base T01. As a result, the transport box T is capable of stacking, wherein the apron section T04 of a transport box T which is upper in the stack enters into an opening which is bounded outwardly by the box wall T01 of the transport box T disposed thereunder. Through different design of the transverse sides of the transport box T in the region of the box wall T02 and of the apron section T04—see FIGS. 4 and 5 respectively on the left hand side and right hand side of the transport box T—it is thereby ensured that the transport boxes T can be stacked only in mutual longitudinal orientation, but not turned through 180° relative to one another.

In addition, the apron section T04 is stiffened relative to the box base T01 at the longitudinal sides of the transport box T by use of a plurality of ribs T05, as can be seen in, in particular, FIG. 5. Moreover, according to FIG. 5 a longitudinal web T06, which is similarly stiffened by ribs T05 relative to the box base T01 and lies on the box base T01 near the center, and a plurality of transverse webs T07, which are connected at the inside at right angles with the apron section T04, extend on the lower side of the transport box T over the box base T01. The apron section T04, longitudinal web T06 and transverse webs T07 of the transport box T have the same height with respect to the box base T01 so that the transport box T can be securely set down thereon, whether on, for example, a flat table when filling the transport box T or, for example, for transport of the transport box T on a transport belt or the like.

According to, in particular, FIG. 4 the box wall T02 is provided on a longitudinal side, which is at the front in FIG. 4, of the transport box T with a slot T08, which basically serves the purpose of receiving a paper prescription order as information carrier. In the illustrated embodiment instead of a paper an information carrier IT in the form of an RFID, which can be both read and written to be recognized by the computer process control system, is received in the slot T08.

An insert part ET of plastics material constructed for mechanically positive reception of two block pieces B is retained at the box base T01 adjacent to the slot T08, as FIGS. 6 to 9 show. The insert part ET is in that regard mechanically positively held in longitudinal and transverse direction of the transport box T by way of webs T09 projecting from the box base T01 and engaging in associated cut-outs ET1 of the insert part ET. The insert part ET has with respect to a transverse axis of the insert part ET a mirror-symmetrical arrangement of two substantially hollow-cylindrical receiving sections ET2 for the block pieces B, which shall be briefly described in the following.

Figure 8:
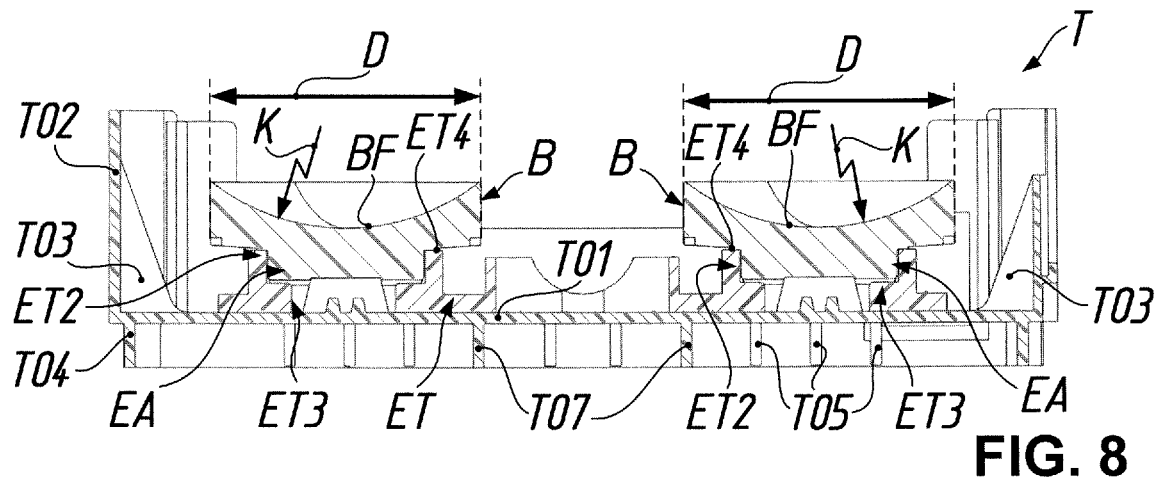
FIG. 8 shows a sectional view, which is rotated in the drawing plane through 180°, of the transport box of FIG. 4 equipped in accordance with FIG. 6, in correspondence with the section line VIII-VIII in FIG. 7.
Figure 9:
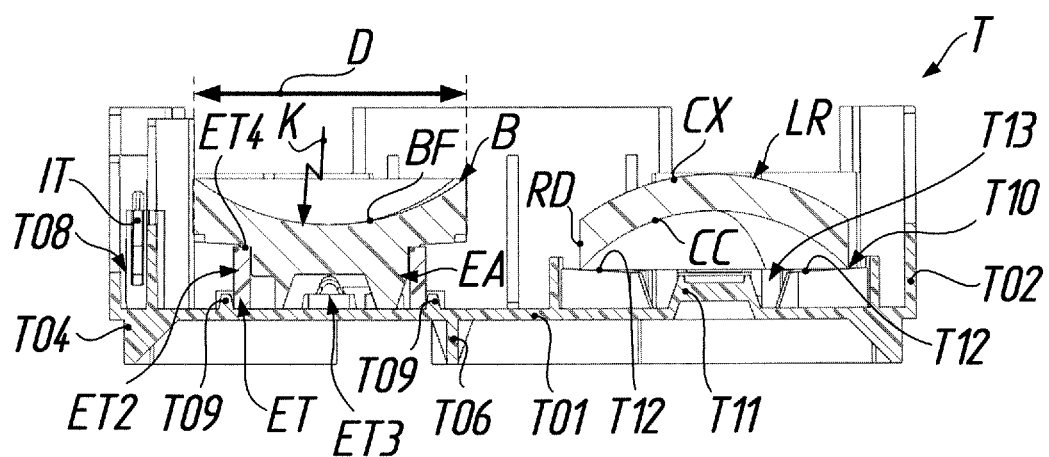
FIG. 9 shows a sectional view, which is rotated in the drawing plane through 90° in clockwise sense, of the transport box of FIG. 4 equipped in accordance with the FIG. 6, in correspondence with the section line IX-IX in FIG. 7.

As the sectional views according to FIGS. 8 and 9 show, each block piece B has in known design generally a substantially rotationally symmetrical base body made from a suitable plastics material. The base body of the block piece B has on a side, which is upper in FIGS. 8 and 9, a lens fastening surface BF which has a predetermined diameter D and a defined block curvature K and on which the lens blank LR can be blocked by use of a blocking material M (see FIG. 10). On the other side, which is lower in FIGS. 8 and 9, the block piece B has a standardized chucking section EA by way of which the lens blank LR blocked on the base body can be fixed in a machine or device for processing or treating the lens blank LR. With respect to further details of a suitable block piece B, reference is expressly made at this point to the afore-mentioned brochure of the Applicant and to document U.S. Pat. No. 8,905,388 which are hereby incorporated by reference. Examples of suitable blocking materials M can, however, be inferred from document U.S. Pat. No. 8,382,932 which also is hereby incorporated by reference. Instead of the optically hardenable blocking materials disclosed there, use can obviously also be made of other blocking materials, for example thermoplastic plastics materials.

Within the receiving sections ET2, several projections ET3 are formed at the insert part ET near the box base T01 of the transport box T and form structures complementary with corresponding cut-outs in the chucking section EA of the respective block piece B. An inner diameter of the receiving sections ET2 of the insert part ET is so selected that it substantially corresponds with an outer diameter of the chucking sections EA of the block pieces B, as can be seen in FIGS. 8 and 9. The block pieces B can thus be tightly and securely held at the receiving sections ET2 of the insert part ET in the transport box T. In that case, the block pieces B lie by the base bodies thereof on the annular end surfaces ET4 of the receiving sections ET2, whereas the projections ET3, which co-operate with the chucking sections EA of the block pieces B, of the insert part ET ensure in the transport box T an orientation of the block pieces B in rotational angle about a longitudinal axis of the block pieces B. However, although not shown in the figures, appropriate measures for reception and orientation of the block pieces can also be provided directly at the box base, without an insert part.

A plurality of web-shaped receiving projections T10 is formed at the box base T01 on the upper side, which lies adjacent to the insert part ET for the block pieces B, of the box base T01 in similarly mirror-symmetrical arrangement with respect to a transverse axis of the transport box T. According to FIGS. 4 and 7, the receiving projections T10 are respectively grouped in a circle in star-like manner about one of two central protrusions T11 of the box base T01. In that case, upper end surfaces T12 of the receiving projections T10 drop away in their height relative to the box base T01 towards the projections T11, as can be best seen in FIGS. 4 and 9, as a result of which lens blanks LR or spectacle lenses L (FIG. 11) placed on the receiving projections T10 in accordance with FIGS. 6 to 9 contact the receiving projections T10 at the end surfaces T12 by only an edge region and at the same time undergo a degree of centering.

Finally, structures complementary to the chucking sections EA of the block pieces B, i.e. the receiving projections T10 and protrusions T11, are also formed at the box base T01 in this region of the transport boxes T at the reference numeral T13. This makes it possible to receive and transport, in correspondence with FIG. 10, the lens blanks LR or spectacle lenses L in blocked state by way of the block pieces B in mechanically positively secured and positionally oriented manner in the transport boxes T.

Figure 10:
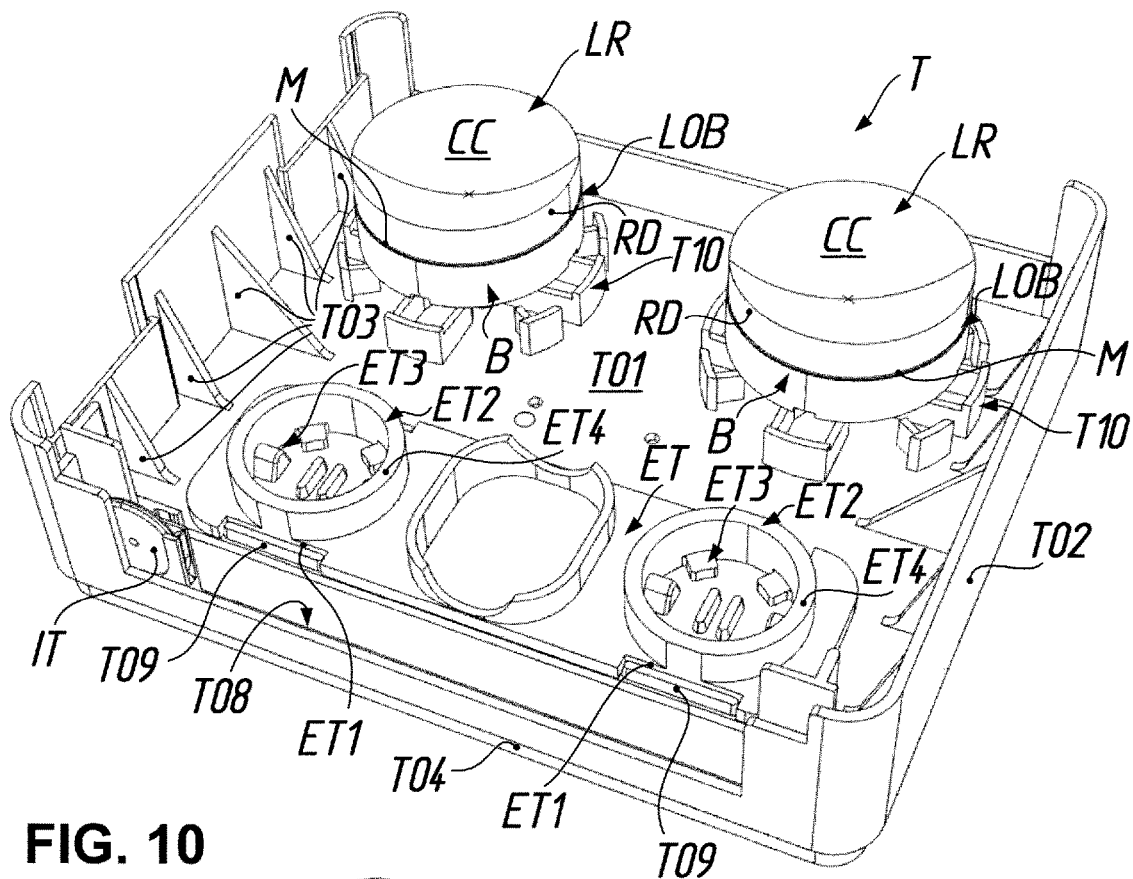
FIG. 10 shows a perspective view of the transport box according to FIG. 4 obliquely from above and front right, in which the lens blanks blocked on the block pieces are received in order to be transported in the production layout of FIG. 1 to a preliminary processing station.

As to, in particular, the blocking and the blocked state of the lens blanks LR or spectacle lenses L as well as the terminology used herein in that connection it may additionally be mentioned at this point with reference to FIGS. 9 and 10 that the provided lens blanks LR have a first surface CX, a second surface CC opposite the first surface CX and an edge RD between the first surface CX and the second surface CC, wherein the first surface CX of the respective lens blank LR in the blocked state faces the lens fastening surface BF of the associated block piece B, with the blocking material M therebetween as a temporary fastening means. In the preferred embodiment described here, the first surface CX of the respective lens blank LR has prior to the blocking not only a finished geometry which has been subject to preliminary processing and precision processing, but in addition is also already provided with a coating (hard coating and anti-reflection coating). The actual processing or treatment of the lens blanks LR takes place in the production shop described here, thus only at the second surface CC of the respective lens blank LR and optionally at the edge RD thereof.

Figure 11:
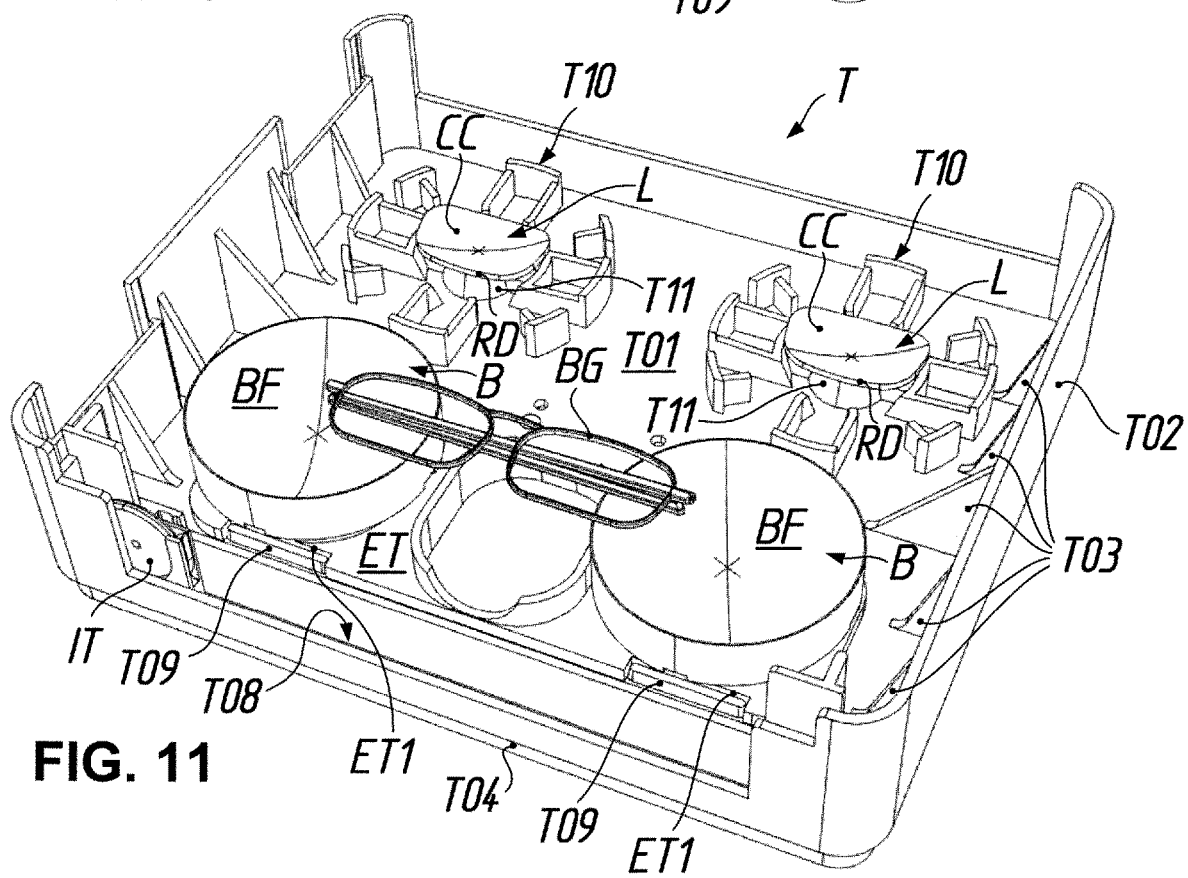
FIG. 11 shows a perspective view of the transport box according to FIG. 4 obliquely from above and front right, in which two treated and edged spectacle lenses, the two block pieces on which the treatment took place, and a matching spectacle frame are received in order in the finishing region of the production layout of FIG. 1 to be transported in accordance with FIG. 3 after leaving a spectacle frame store to a station for frame mounting, final checking and packing.

Finally, in FIG. 11 it is shown by way of example with respect to the transport boxes T that the transport boxes T during production of the spectacle lens L serve not only for reception and transport of the lens blanks LR, the block pieces B and the processed or treated, as illustrated in FIG. 11, and optionally also edged spectacle lenses L—in each instance in unblocked, blocked or deblocked state depending on processing status—but moreover can also receive and transport other production-relevant parts associated with the respective prescription order, such as, for example, spectacle frames BG or tools (not illustrated here).

Returning to FIGS. 1 to 3, the production layout of FIG. 1 and the production method carried out therewith shall now be explained in more detail. It is firstly to be noted at this point that for the production method there is a fixed association between the block pieces B and the transport boxes T, wherein associated block pieces B and transport boxes T are always stored together and, as already mentioned, are transported on transport belts through the production shop. It is additionally assumed that in the production shop shown here use is made of between 20 and 40 block piece types, which differ in geometry with respect to diameter D and block curvature K of the lens fastening surface BF, so as to process predominantly lens blanks LR of plastics materials, thus ductile materials. In that regard, each of the block pieces B has to be identified by way of an individual numerical sequence, which, for example, is applied by use of a DMC to the block piece B, so that it can be detected during filling of the transport boxes T with the block pieces B and filed in the computer process control system PS.

As far as the coding of the transport boxes T is concerned there is initially stored on the information carrier IT (RFID in the present embodiment) of the respective transport box T a numerical sequence which is composed of a first, invariable numerical group for identification of the information carrier IT and thus the respective transport box T and two further, variable numerical groups.

Linking with the numerical sequence of the block pieces B received in this transport box T is carried out in the process control PS by way of the invariable numerical group of the transport box T. By contrast, the variable numerical groups of the RFID of the transport box T serve for memorizing the geometry of the respectively associated block pieces B (diameter D and block curvature K) in the RFID of the corresponding transport box T by use of the process control PS as a function of the DMC detected at the respective block pieces B.

In most cases, two block pieces B of the same type are assigned to a transport box T. However, it is obviously also possible for two block pieces B of different type to be assigned to a transport box T (so-called "mismatch" jobs in the case of an anisometropia in the corresponding prescription order).

In addition, in a given case a further item of status information or geometry information can be stored on the RFID of the transport box T. The afore-described linking of the individual block piece numerical sequence with the invariable numerical group of the respective transport box T makes it possible to store in the process control PS for each individual block piece B, through detection of the information carrier IT of the associated transport box T, for example the number of blocking processes for this block piece B.

It is schematically illustrated FIGS. 1 to 3 how the transport boxes T are transported on conveyor belts through the spectacle lens production, wherein the top storage positions, previously described with reference to FIGS. 4 to 11, of each transport box T are indicated by four squares. Depending on the respective processing advance of the lens blanks LR or spectacle lenses L transported in the transport boxes T the following filling states are to be seen:

a) The two upper squares each contain a circle with a cross, whereas the two lower squares are empty: merely block pieces B are present in the corresponding transport boxes T.

b) The two upper squares each contain a circle with a cross, whereas unfilled circles are illustrated in the two lower squares: block pieces B and lens blanks LR in the unblocked state are present in the corresponding transport boxes T, in correspondence with FIGS. 6 to 9.

c) The two upper squares are empty, whereas filled circles are shown in the two lower squares: blocked lens blanks LR, as illustrated in FIG. 10, or blocked, processed spectacle lenses L are present in the corresponding transport boxes T.

d) Special case: There can be seen, inter alia, an unfilled and a filled circle in the squares: in the case of the prescription order in this transport box T there was a problem with deblocking and/or an impermissible contamination of at least one deblocked, processed spectacle lens L.

e) Subcase: The two upper squares each contain a circle with a cross, whereas a respective ellipse is illustrated in each of the two lower squares: block pieces B and deblocked, treated spectacle lenses L also processed at the edge RD are present in the corresponding transport box T.

f) Further subcase: As for the subcase e), wherein in addition a spectacle frame BG is shown: this transport box T is filled as illustrated in FIG. 11.

In addition, the individual working or processing stations are marked by symbols, wherein workstations AS1 to AS9, which are described in more detail below and at which merely steps for preliminary processing or adjusting of the lens blanks or spectacle lenses L are carried out, have a single edging, whereas processing stations BS1 to BS6, which are similarly described in more detail in the following and in which the lens blanks LR or spectacle lenses L undergo a change through processing or treatment (value-enhancing measures at the lenses), are provided with double edging.

The central process control PS is symbolically marked in FIG. 1 by a lozenge. Detecting devices with solid triangles are indicated along the conveyor paths or conveyor belts of the production line of FIG. 1, in the block piece store BL according to FIG. 2 and in the finishing region FSB according to FIG. 3, which devices automatically detect the transport boxes T when passing and pass on the data stored in the information carrier's IT (reading and transmitting function) to the process control PS. If, for example, a detected transport box T is to be processed in a processing station following a detecting device this transport box T is released by the process control PS for processing and transferred over to the corresponding processing station.

Apart from these detecting devices having exclusively a reading and transmitting function, still further detecting devices marked with lozenges are provided in the working or processing stations and stores for block pieces B, lens blanks LR and spectacle frames BG, these devices communicating with the process control PS and conversely (reading function, transmitting function and receiving function). If, for example, a transport box T is detected in a processing station by the process control PS by way of a detecting device of that kind then the process control PS transmits the processing data, which is filed for a respective prescription order, to this processing station.

If this lozenge is in addition illustrated in solid form, then the corresponding detecting device additionally has a writing function for changing or expanding the information in the information carrier IT of the transport box T instantaneously present. The latter detecting devices additionally pass on production-relevant data to the process control PS.

In the production shop according to FIG. 1 the production of individual spectacle lenses L in accordance with prescription order now takes place as follows: Prior to the actual production, transport boxes T constructed expressly as described above are manually furnished in a preliminary processing station VS with block pieces B, wherein linking of the block pieces B with the respective transport box T takes place by way of the process control PS as explained above. The transport box T furnished with the block pieces B is then deposited on a conveyor belt in the direction of the block piece store BL.

Figure 2:
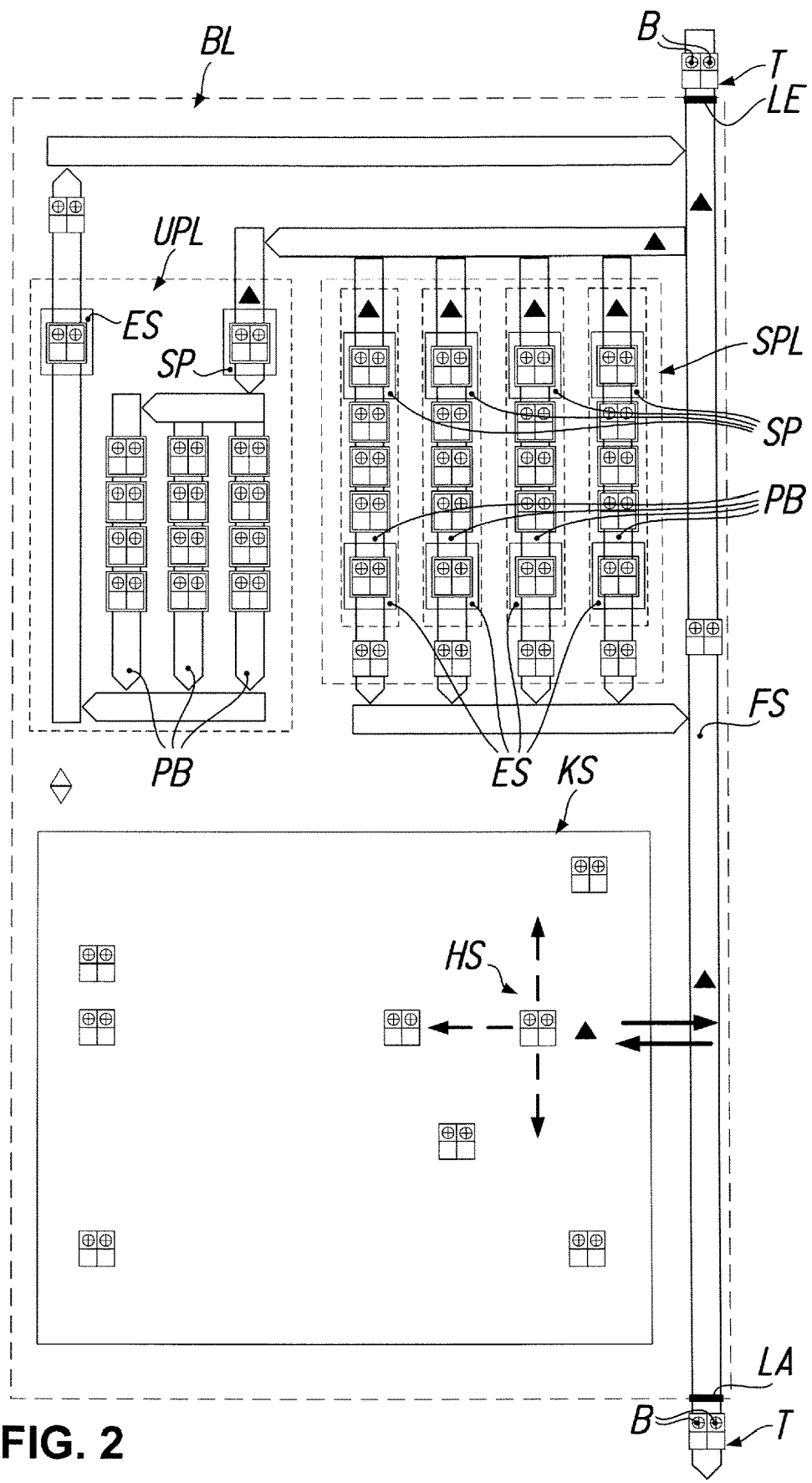
FIG. 2 shows the block piece store of the production layout according to FIG. 1 in correspondence with the block II in FIG. 1.
Figure 3:
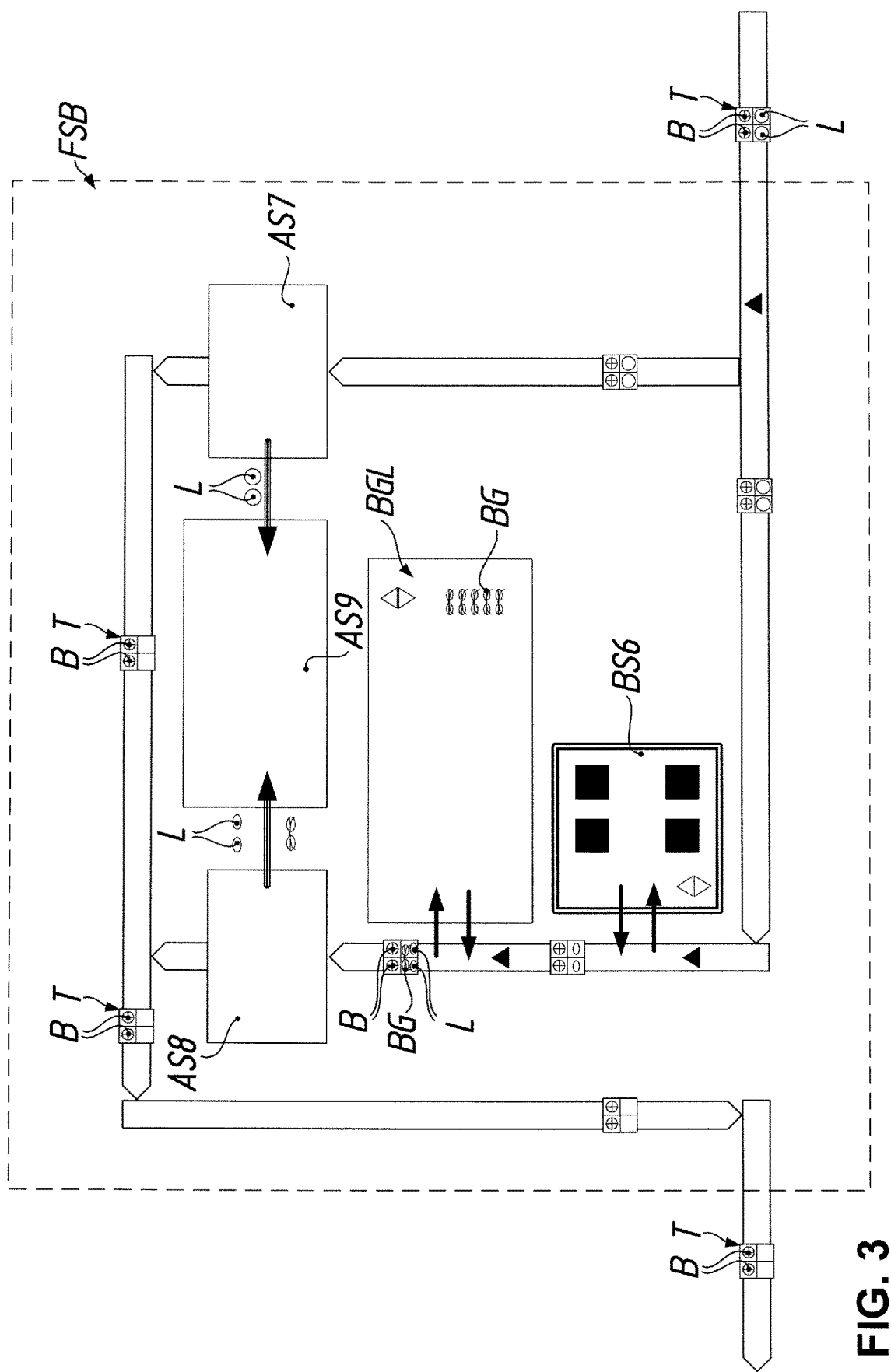
FIG. 3 shows the finishing region for the spectacle lenses and spectacles of the finishing layout according to FIG. 1 in correspondence with the block III in FIG. 1.

According to FIG. 2 the block piece store BL generally comprises a store entrance LE and a store exit LA, which are connected together by way of a conveyor path FS for the transport boxes T. The block piece store BL additionally has three different storage regions, namely a sorted buffer store SPL, an unsorted buffer store UPL and a flexible box store KS. The conveyor path FS is connected in the block piece store BL with the storage regions, wherein the transport boxes T with the block pieces B received therein are selectably conveyed under the control of the process control PS by way of the conveyor path FS from the store entrance LE to the respective storage region, from the respective storage region to the store exit LA or from the store entrance LE directly to the store exit LA.

After travelling beyond the store entrance LE the geometry data of the block pieces carried by the respective transport box T are detected, as described, in the block piece store BL by a detecting device which, according to FIG. 2, is provided behind the store entrance LE and the respective transport box T is assigned either to the sorted buffer store SPL or the flexible box store KS depending on the respective block piece type which is loaded. A maximum number of store places is reserved by the process control PS in these stores individually for each block piece type. If all appropriate store places should be occupied, the transport box T is intermediately stored in the unsorted buffer store UPL.

In the flexible box store KS the transport boxes T with the block pieces B received therein are chaotically stored at fixed storage places by use of a handling system, wherein association of the respective storage place with the transport box T stored thereat is carried out by way of the process control PS as a function of the information of the corresponding information carrier IT at the transport box T.

A respective plurality of transport boxes T is combined in stackers SP to form a stack of transport boxes T in each of the sorted buffer store SPL and the unsorted buffer store UPL (marked in FIG. 2 by a double line around the transport boxes T). The respective stacks of transport boxes T are then shifted on a buffer belt PB for intermediate storage behind the respective stacker SP. In order to remove individual transport boxes T, the stacks of transport boxes T are separated again in unstackers ES and returned on the conveyor path FS.

Whereas the transport boxes T with the block pieces B received therein are stored in the sorted buffer store SPL with sorting in accordance with block piece type or block piece geometry in correspondence with the information of the information carrier IT at the respective transport box T, wherein occupation of the buffer belts PB—four in the illustrated embodiment—of the sorted buffer store SPL is carried out with those transport boxes T which contain the most popular types of block pieces B, all excess transport boxes T with the block pieces B respectively contained therein are intermediately stored in the unsorted buffer store UPL.

The exit of the unsorted buffer store UPL lies on the conveyor path FS directly behind the store entrance LE of the block piece store BL, but still in front of the detecting device provided thereat, so that the transport boxes T coming from the unsorted buffer store UPL can be detected again and if needed sorted into one of the two other storage regions.

On presentation of a prescription order, with knowledge of the geometry of the spectacle lenses to be produced a transport box T with block pieces B appropriate thereto is usually demanded by the process control PS from the block piece store BL and transported by way of the transport belt to a semi-finished product store HL. The transport box T is here detected again by the process control PS and subsequently thereto manually or automatically loaded with usually round or oval, still unedged, lens blanks LR which have already been processed to finished state at the first surface CX thereof (cf. FIGS. 6 to 9), preferably even finish-coated (hard coating and anti-reflection coating). If the transport box T is, as in the present embodiment, equipped with a writable information carrier IT this can if required be provided with a reference indicating urgency of the respective prescription order.

For the subsequent step (i) of blocking, the provision of the respective block piece B is thus habitually carried out by way of the process control PS as a function of the geometry, which is defined by the prescription order, of the spectacle lens L, which is to be produced, by issue from the block piece store BL of the transport box T loaded with the corresponding block piece B identified by the information carrier IT. As an alternative thereto, however, the provision of a specific lens blank LR for the step (i) of blocking can also be carried out by way of the process control PS as a function of the information of the information carrier IT with respect to the block piece geometry of the block piece B which is present in the transport box T currently transported by way of the conveyor path FS between store entrance LE and store exit LA.

Next, the transport box T is transported to a blocking station AS1. Blocking of the lens blanks LR on the block pieces B brought along in the same transport box T is carried out here. For blocking, use is preferably made of devices such as described in detail in document U.S. Pat. No. 8,616,150, which is hereby incorporated by reference with respect to construction and function of these devices. In summary, in the case of the blocking method used the lens blank LR is positioned so as to leave a gap relative to the block piece B, which is then filled out by a blocking material M, which cures under ultraviolet light, before the blocking material M is hardened by irradiation with ultraviolet light and thus the lens blank LR fixed to the block piece B. The thereby-resulting individual block height is reported to the process control PS and in the case of a writable information carrier IT can be similarly stored thereon. The lens blanks LR blocked on the block pieces B are subsequently re-inserted into the respective transport box T at the lens positions according to FIG. 10, after which the transport box T is transported onward to a preliminary processing station BS1.

In the preliminary processing station BS1 the blocked lens blanks LOB are firstly removed from the transport box T and processed at the second surface CC, also termed "generating" in the line of work. In that regard, the macrogeometry to be created in accordance with the prescription order at the second surface CC of the respective blocked lens blank LOB is produced by machining with tools with a specific edge. Use is made of, in particular, so-called "generators" which for the processing of plastics material can provide combined milling and turning and for that purpose have not only a milling spindle, but also a fast-tool servo for drive of a turning chisel, such as described in, for example, document U.S. Pat. No. 7,975,356 which is hereby incorporated by reference. For the milling work, initially so-called "cribbing" can be carried out in order to rapidly remove material, wherein the circumference of the lens blanks LR is reduced to an extent necessary for formation of the optically effective surface. In that regard, it can happen that in company with the lens blank LR the block piece is decentered so that it receives a different diameter D at the lens fastening surface BF. This can be reported by the preliminary processing station BS1 to the process control PS, whereupon the corresponding block pieces B are reclassified for the next cycle in the production line. In the case of use of a writable information carrier IT this diameter information can also be directly updated on the information carrier IT.

Subsequently, the blocked lens blanks LOB are reloaded into the respective transport box T and transported by way of the transport belt onward in the direction of a precision processing station BS2. Precision processing of the optically effective surfaces is carried out here by a precision grinding machine or a polishing machine so as to remove preliminary processing tracks and achieve the desired microgeometry. Such a polishing machine is described in for example, document U.S. Pat. No. 8,628,071 or document U.S. Publication No. 2017/0246720 which are hereby incorporated by reference.

The transport box T carrying the blocked lens blanks LOB goes onward to a marking station BS3 in which the blocked lens blanks LOB are, for example, engraved by use of a laser. Apart from assist points for later orientation for edge processing, markings for the installation side, logos, manufacturer designations, addition effect of the spectacle lens and the order number can be engraved here.

The blocked lens blanks LOB are then transported onward by the transport box T to a coating station BS4. A hard coating is applied there for protection of the finished optically effective surfaces of the blocked lens blanks LOB. For that purpose the blocked lens blanks LOB are firstly automatically cleaned and dried, after which they are coated by use of dip coating plant or centrifugal coating plant as described in, for example document U.S. Pat. No. 7,748,341 B1 which is hereby incorporated by reference so as to obtain processed, blocked spectacle lenses L.

The following (optional) vacuum coating station BS5, which the blocked spectacle lenses LOB reach in their transport box T, offers the possibility of applying further coatings such as anti-reflection or anti-adhesion coatings under vacuum conditions, for which purpose the blocked spectacle lenses LOB are moved into the vacuum coating station BS5 initially for drying and degasification without the transport box T through tunnel ovens.

After the coating process the blocked spectacle lenses LOB are brought by use of their transport box T to a deblocking station AS2, where the spectacle lenses L are automatically separated from the block pieces B, as already described in the introduction. A device of that kind for particularly rapid and certain deblocking of optical workpieces is known from, for example, document U.S. Pat. No. 8,931,769 which is hereby incorporated by reference. Thereafter, both the spectacle lenses L and the block pieces B of the respective prescription order are placed back in the associated transport box T.

From the deblocking station AS2 the respective transport box T is transported on the conveyor belt through a station AS3 for recognition of blocking material residue. If no blocking material residues can be detected by the station AS3 for blocking material residue recognition on the deblocked spectacle lenses L present in the transport box T the respective transport box T is released by way of the process control PS for onward transport and can pass a switch downstream of the station AS3 for recognition of blocking material residue. If the spectacle lenses L in the deblocking station AS2 could not be successfully deblocked or if blocking material residues are still present on the spectacle lenses L then the corresponding transport box T is barred by the process control PS from onward transport and at the downstream switch is removed into a station AS4 for manual deblocking and cleaning.

After successful subsequent processing (manual deblocking or cleaning of the spectacle lenses L) the transport box T is returned on the transport belt to back in front of the station AS3 for recognition of blocking material residue and passes this again in order to gain release. If contamination on or at the block pieces B is ascertained at the station AS3 for recognition of blocking material residue this is reported to the process control PS and this transport box T with its block pieces B is barred from the next cycle.

The released spectacle lenses L and block pieces B then pass in their transport box T to a cleaning station AS5. An automated cleaning of the spectacle lenses L in a brush washing train as well as optionally manual cleaning of the block pieces B is carried out here.

Thereafter, the spectacle lenses L and block pieces B together with the associated transport box T pass to a checking station AS6 in which a properties check of the spectacle lenses L with respect to the properties thereof in accordance with prescription is carried out and the spectacle lenses L are additionally checked for mechanical damage such as scratches and other cosmetic problems.

Subsequently, thereto the transport boxes T together with their block pieces B and spectacle lenses L of the respective prescription order travel to a finishing region FSB shown in FIG. 3 to enlarged scale. The transport boxes T with the spectacle lenses L not to be edged are there identified by the process control PS and removed to a station AS7 for final checking and packing. The spectacle lenses L are there removed from the respective transport box T, checked, packed and passed on without the transport box T to a common dispatch point AS9 for all spectacle lenses L or spectacles. The transport box T, which is now still furnished merely with the associated block pieces B, is in the meantime transported onward in the direction of the block piece store BL.

By contrast, the transport boxes T with the spectacle lenses L to be edged pass together with the associated block pieces B to an edge processing station BS6 with at least one device for edge processing of spectacle lenses—also termed "edger" in the line of work—such as is available from, for example, the Applicant under the trade designation "ES-5". In this device the spectacle lenses L are removed from the transport boxes T and the edges of the spectacle lenses L are so processed in accordance with the processing specifications filed in the process control PS that the spectacle lenses L can be inserted into a preselected spectacle frame BG. The spectacle lenses L with finished edges are subsequently placed back in the transport box T with respect to the block pieces B present therein.

If the spectacle lenses L are also to be mounted in the production shop in a spectacle frame BG they are initially transported together with the block pieces B in the transport box T into a spectacle frame store BGL in which the appropriate spectacle frame BG is loaded into the transport box T.

A station AS8 for frame mounting, final checking and packing follows the spectacle frame store BGL. If the spectacle lenses L with finished edging are not to be mounted in situ, these are directly transported from the edge-processing station BS6 to the station AS8 for frame mounting, final checking and packing. The edged spectacle lenses L are here removed from the transport box T, checked, optionally mounted in the spectacle frame BG, packed and passed on without the transport box T to the common dispatch point AS9. The transport boxes T laden with the block pieces B are transported back in the direction of the block piece store BL.

Since not only the block pieces B, but also the transport boxes T have to be cleaned and checked at regular intervals and in addition the block pieces B obviously have a limited service life, the transport boxes T after leaving the finishing region FSB are again detected by the process control PS. In the illustrated embodiment the process control PS on detection of the information carrier IT also has information about frequency of use of the block pieces B contained in the respective transport box T. As a function of this information the process control PS controls a switch WH, which is upstream of the block piece store BL, in such a way that the switch WH in the case of, for example, exceeding of a predetermined frequency of use removes the corresponding transport box T for manual collection and basic cleaning of block piece B and/or transport box T out to the preliminary processing station BS, but otherwise passes on the corresponding transport boxes T with the block pieces B received therein to the block piece store BL. Other cases of removal by way of the switch WH are attainment of the service life of the respective block pieces B or also the already above-discussed "mismatch" jobs in a transport box T.

Finally, with respect to further details relating to individual steps of an ART production line reference is additionally made at this point expressly to the Applicant's brochure discussed in the introduction.

A method of producing individual spectacle lenses in accordance with a prescription order comprises the steps: (i) blocking a prepared lens blank as a workpiece on a block piece, which is provided from a plurality of block pieces from a block piece store, by use of a blocking material, wherein a first surface of the lens blank faces the block piece, (ii) processing the blocked lens blank at least at a second surface so as to obtain a blocked, processed spectacle lens as a workpiece and (iii) deblocking the processed spectacle lens from the block piece, wherein the workpiece, optionally in blocked state, is transported between the steps (i) to (iii) in one of a plurality of provided transport boxes. In the method the block pieces prior to the step (i) of blocking are stored in the transport boxes in the block piece store and for the step (i) of blocking are provided in the transport boxes from the block piece store and/or the block pieces after the step (iii) of deblocking are transported in the transport boxes to the block piece store.

Variations and modifications are possible without departing from the scope and spirit of the present invention as defined by the appended claims.

I claim:

1. A method for producing individual spectacle lenses (L) in accordance with a prescription order, comprising the steps of:
    (i) blocking a provided lens blank (LR) as workpiece, which has a first surface (CX), a second surface (CC) opposite the first surface (CX) and an edge (RD) between the first surface (CX) and the second surface (CC), with the help of a blocking material (M) on a block piece (B) provided from a plurality of block pieces (B) from a block piece store (BL), wherein the first surface (CX) of the lens blank (LR) faces a lens fastening surface (BF) of the block piece (B);
    (ii) processing the blocked lens blank (LR) at least at the second surface (CC) so as to obtain a blocked, processed spectacle lens (L) as a workpiece; and
    (iii) deblocking the processed spectacle lens (L) from the block piece (B);
    wherein the workpiece, which in each instance may be in the blocked state, is transported between the steps (i) to (iii) in one of a plurality of provided transport boxes (T);
    Characterized in that the block pieces (B) are transported in the transport boxes (T) to the block piece store (BL) after the step (iii) of deblocking.

2. A method according to claim 1, characterized in that the block pieces (B) are stored in the transport boxes (T) in the block piece store (BL) prior to the step (i) of blocking and are provided in the transport boxes (T) from the block piece store (BL) for the step (i) of blocking.

3. A method according to claim 2, characterized in that block pieces (B) with different predetermined block piece geometries differing with respect to a block curvature (K) of the lens fastening surface (BF) and/or a diameter (D) of the lens fastening surface (BF) are stored in the transport boxes (T) in the block piece store (BL), the store being provided with at least one storage region, wherein at least one of the transport boxes (T) and the block pieces (B) are provided with an information carrier (IT) which when detected by way of a process control (PS), particularly for sorting the block piece store (BL) and in a given case provision of specific block pieces (B) for the step (i) of blocking, imparts at least information about the block piece geometry of the block pieces (B) contained in the respective transport box (T).

4. A method according to claim 3, characterized in that the block piece store (BL) comprises a flexible box store (KS) as storage region in which the transport boxes (T) with the block pieces (B) received therein are chaotically stored at fixed storage places, wherein an association of the respective storage place with the transport box (T) stored thereat is carried out as a function of the information of the corresponding information carrier (IT).

5. A method according to claim 4, characterized in that the block piece store (BL) comprises an unsorted buffer store (UPL) as storage region in which the transport boxes (T) with the block pieces (B) received therein are stored unsorted, wherein stacking of the transport boxes (T) is preferably carried out.

6. A method according to claim 5, characterized in that the block piece store (BL) comprises a sorted buffer store (SPL) as storage region in which the transport boxes (T) with the block pieces (B) received therein are stored and sorted according to block piece geometry in correspondence with the information of the information carrier (IT), wherein stacking of the transport boxes (T) respectively with the same block pieces (B) is carried out.

7. A method according to claim 6, characterized in that the block piece store (BL) has a store entrance (LE) and a store exit (LA) connected together by way of a conveyor path (FS) for the transport boxes (T), the path being connected with the storage region or storage regions, wherein the transport boxes (T) with the block pieces (B) received therein are conveyed by way of the conveyor path (FS) under control by the process control (PS) selectably from the store entrance (LE) to the respective storage region, from the respective storage region to the store exit (LA) or from the store entrance (LE) directly to the store exit (LA).

8. A method according to claim 7, characterized in that for the step (i) of blocking the provision of the respective block piece (B) is carried out by way of the process control (PS) as a function of a geometry, which is defined by the prescription order, of the spectacle lens (L), which is to be produced, by output from the block piece store (BL) of the transport box (T) loaded with the corresponding block piece (B) identified by way of the information carrier (IT).

9. A method according to claim 7, characterized in that for the step (i) of blocking the provision of a specific lens blank (LR) is carried out by way of the process control (PS) as a function of the information of the information carrier (IT) with respect to the block piece geometry of the block piece (B) contained in the transport box (T) currently conveyed by way of the conveyor path (FS) between store entrance (LE) and store exit (LA).

10. A method according to claim 3, characterized in that the process control (PS) on detection of the information carrier (IT) also has information concerning frequency of use of the block pieces (B) contained in the respective transport boxes (T), wherein a switch (WH) is arranged upstream of the block piece store (BL) and is so controlled by the process control (PS) as a function of this information that the switch (WH) when a predetermined frequency of use is exceeded transfers out the corresponding transport boxes (T) for manual collection and cleaning of the block piece (B) and/or transport box (T), but otherwise passes on the corresponding transport boxes (T) with the block pieces (B) received therein to the block piece store (BL).

11. A method according to claim 10, characterized in that the information carrier (IT) at the transport boxes (T) and/or the block pieces (B) is not only readable, but also writable with information, wherein for consideration in relation to downstream steps the information of the respective information carrier (IT) is changed or extended by writing:
  prior to the step (i) of blocking, with respect to urgency of the respective prescription order, and/or
  at the time of the step (i) of blocking, with respect to blocking parameters relevant to the step (ii) of processing, and/or
  during the step (ii) of processing, with respect to changes in geometry of the respective block pieces (B), and/or
  after the step (iii) of deblocking, with respect to a need for cleaning the respective block pieces (B).

12. A method according to claim 1, characterized in that block pieces (B) with different predetermined block piece geometries differing with respect to a block curvature (K) of the lens fastening surface (BF) and/or a diameter (D) of the lens fastening surface (BF) are stored in the transport boxes (T) in the block piece store (BL), the store being provided with at least one storage region, wherein at least one of the transport boxes (T) and the block pieces (B) are provided with an information carrier (IT) which when detected by way of a process control (PS), particularly for sorting the block piece store (BL) and in a given case provision of specific block pieces (B) for the step (i) of blocking, imparts at least information about the block piece geometry of the block pieces (B) contained in the respective transport box (T).

13. A method according to claim 12, characterized in that the block piece store (BL) comprises a flexible box store (KS) as storage region in which the transport boxes (T) with the block pieces (B) received therein are chaotically stored at fixed storage places, wherein an association of the respective storage place with the transport box (T) stored thereat is carried out as a function of the information of the corresponding information carrier (IT).

14. A method according to claim 3, characterized in that the block piece store (BL) comprises an unsorted buffer store (UPL) as storage region in which the transport boxes (T) with the block pieces (B) received therein are stored unsorted, wherein stacking of the transport boxes (T) is preferably carried out.

15. A method according to claim 3, characterized in that the block piece store (BL) comprises a sorted buffer store (SPL) as storage region in which the transport boxes (T) with the block pieces (B) received therein are stored and sorted according to block piece geometry in correspondence with the information of the information carrier (IT), wherein stacking of the transport boxes (T) respectively with the same block pieces (B) is carried out.

16. A method according to claim 3, characterized in that the block piece store (BL) has a store entrance (LE) and a store exit (LA) connected together by way of a conveyor path (FS) for the transport boxes (T), the path being connected with the storage region or storage regions, wherein the transport boxes (T) with the block pieces (B) received therein are conveyed by way of the conveyor path (FS) under control by the process control (PS) selectably from the store entrance (LE) to the respective storage region, from the respective storage region to the store exit (LA) or from the store entrance (LE) directly to the store exit (LA).

17. A method according to claim 3, characterized in that for the step (i) of blocking the provision of the respective block piece (B) is carried out by way of the process control (PS) as a function of a geometry, which is defined by the prescription order, of the spectacle lens (L), which is to be produced, by output from the block piece store (BL) of the transport box (T) loaded with the corresponding block piece (B) identified by way of the information carrier (IT).

18. A method according to claim 16, characterized in that for the step (i) of blocking the provision of a specific lens blank (LR) is carried out by way of the process control (PS) as a function of the information of the information carrier (IT) with respect to the block piece geometry of the block piece (B) contained in the transport box (T) currently conveyed by way of the conveyor path (FS) between store entrance (LE) and store exit (LA).

19. A method according to claim 12, characterized in that the process control (PS) on detection of the information carrier (IT) also has information concerning frequency of use of the block pieces (B) contained in the respective transport boxes (T), wherein a switch (WH) is arranged upstream of the block piece store (BL) and is so controlled by the process control (PS) as a function of this information that the switch (WH) when a predetermined frequency of use is exceeded transfers out the corresponding transport boxes (T) for manual collection and cleaning of the block piece (B) and/or transport box (T), but otherwise passes on the corresponding transport boxes (T) with the block pieces (B) received therein to the block piece store (BL).

20. A method according to claim 3, characterized in that the information carrier (IT) at the transport boxes (T) and/or the block pieces (B) is not only readable, but also writable with information, wherein for consideration in relation to downstream steps the information of the respective information carrier (IT) is changed or extended by writing:
  prior to the step (i) of blocking, with respect to urgency of the respective prescription order, and/or
  at the time of the step (i) of blocking, with respect to blocking parameters relevant to the step (ii) of processing, and/or
  during the step (ii) of processing, with respect to changes in geometry of the respective block pieces (B), and/or
  after the step (iii) of deblocking, with respect to a need for cleaning the respective block pieces (B).

21. A computerized process control system for producing individual spectacle lenses (L) in accordance with a prescription order, comprising the steps of:

(i) blocking a provided lens blank (LR) as workpiece, which has a first surface (CX), a second surface (CC) opposite the first surface (CX) and an edge (RD) between the first surface (CX) and the second surface (CC), with the help of a blocking material (M) on a block piece (B) provided from a plurality of block pieces (B) from a block piece store (BL), wherein the first surface (CX) of the lens blank (LR) faces a lens fastening surface (BF) of the block piece (B);

(ii) processing the blocked lens blank (LR) at least at the second surface (CC) so as to obtain a blocked, processed spectacle lens (L) as a workpiece; and (iii) deblocking the processed spectacle lens (L) from the block piece (B);

wherein the workpiece, which in each instance may be in the blocked state, is transported between the steps (i) to (iii) in one of a plurality of provided transport boxes (T);

characterized in that the block pieces (B) are transported in the transport boxes (T) to the block piece store (BL) after the step (iii) of deblocking.

22. A computerized process control system according to claim 21 characterized in that the block pieces (B) are stored in the transport boxes (T) in the block piece store (BL) prior to the step (i) of blocking and are provided in the transport boxes (T) from the block piece store (BL) for the step (i) of blocking.

23. A computerized process control system according to claim 22, characterized in that block pieces (B) with different predetermined block piece geometries differing with respect to a block curvature (K) of the lens fastening surface (BF) and/or a diameter (D) of the lens fastening surface (BF) are stored in the transport boxes (T) in the block piece store (BL), the store being provided with at least one storage region, wherein at least one of the transport boxes (T) and the block pieces (B) are provided with an information carrier (IT) which when detected by way of a process control (PS), particularly for sorting the block piece store (BL) and in a given case provision of specific block pieces (B) for the step (i) of blocking, imparts at least information about the block piece geometry of the block pieces (B) contained in the respective transport box (T).

24. A computerized process control system for producing individual spectacle lenses (L) in accordance with a prescription order, comprising the steps of:

(i) blocking a provided lens blank (LR) as workpiece, which has a first surface (CX), a second surface (CC) opposite the first surface (CX) and an edge (RD) between the first surface (CX) and the second surface (CC), with the help of a blocking material (M) on a block piece (B) provided from a plurality of block pieces (B) from a block piece store (BL), wherein the first surface (CX) of the lens blank (LR) faces a lens fastening surface (BF) of the block piece (B);

(ii) processing the blocked lens blank (LR) at least at the second surface (CC) so as to obtain a blocked, processed spectacle lens (L) as a workpiece; and (iii) deblocking the processed spectacle lens (L) from the block piece (B), wherein the workpiece, which in each instance may be in the blocked state, is transported between the steps (i) to (iii) in one of a plurality of provided transport boxes (T);

characterized in that block pieces (B) with different predetermined block piece geometries differing with respect to a block curvature (K) of the lens fastening surface (BF) and/or a diameter (D) of the lens fastening surface (BF) are stored in the transport boxes (T) in the block piece store (BL), the store being provided with at least one storage region, wherein at least one of the transport boxes (T) and the block pieces (B) are provided with an information carrier (IT) which when detected by way of a process control (PS), particularly for sorting the block piece store (BL) and in a given case provision of specific block pieces (B) for the step (i) of blocking, imparts at least information about the block piece geometry of the block pieces (B) contained in the respective transport box (T).

* * * * *